United States Patent [19]

Toy

[11] Patent Number: 4,721,832

[45] Date of Patent: Jan. 26, 1988

[54] ELECTRICAL CONNECTION SEALING DEVICE

[75] Inventor: Lester T. Toy, Fremont, Calif.

[73] Assignee: Raychem Corporation, Menlo Park, Calif.

[21] Appl. No.: 859,161

[22] Filed: May 2, 1986

Related U.S. Application Data

[63] Continuation-in-part of Ser. No. 730,407, May 2, 1985, abandoned.

[51] Int. Cl.$^4$ ............................................. H02G 15/04
[52] U.S. Cl. ....................................... 174/87; 29/868;
    156/49; 174/74 A; 174/76; 206/328
[58] Field of Search ...................... 174/87, 74 A, 76;
    29/868; 156/49; 339/115 R, 115 C, 116 R, 116 C; 206/205, 206, 328

[56] References Cited

U.S. PATENT DOCUMENTS

| | | | |
|---|---|---|---|
| 2,524,977 | 10/1950 | Holbrook | 524/254 |
| 3,084,115 | 4/1963 | Smith et al. | 525/304 X |
| 3,585,275 | 6/1971 | Gillemot | 174/87 X |
| 3,590,139 | 6/1971 | Gillemot | 174/74 A X |
| 3,768,941 | 10/1973 | D'Ascoli et al. | 174/87 X |
| 3,839,595 | 10/1974 | Yonkers | 174/87 |
| 3,879,575 | 4/1975 | Dobbin et al. | 174/87 X |
| 3,950,604 | 4/1976 | Penneck | 174/DIG. 8 X |
| 3,962,554 | 6/1976 | Eigel | 174/74 A |
| 3,992,569 | 11/1976 | Hankins et al. | 174/76 X |
| 4,025,717 | 5/1977 | Whittingham | 174/84 R |
| 4,039,742 | 8/1977 | Smith | 174/87 |
| 4,170,575 | 10/1979 | Rothenberg et al. | 174/102 SC X |
| 4,176,245 | 11/1979 | Merlack et al. | 174/76 X |
| 4,187,360 | 2/1980 | Peters | 525/332.5 X |
| 4,221,924 | 9/1980 | Gabriel et al. | 174/74 A X |
| 4,231,986 | 11/1980 | Brauer et al. | 524/590 X |
| 4,332,975 | 6/1982 | Dienes | 174/76 |
| 4,485,218 | 11/1984 | Bell et al. | 525/332.5 X |
| 4,504,699 | 3/1985 | Dones et al. | 174/76 X |
| 4,509,821 | 4/1985 | Stenger | 174/23 C X |

*Primary Examiner*—Morris H. Nimmo
*Attorney, Agent, or Firm*—Edith A. Rice; Herbert G. Burkard

[57] ABSTRACT

The invention relates to an article for sealing the exposed portion an electrical connection, especially motor connections, of two or more cables comprising an envelope, having an opening at one end, of a material having a flexural modulus of at least 1,000 psi at 23° C. The envelope contains a polymeric gel having a cone penetration value of about 30 to about 400 (10$^{-1}$ mm) and an elongation of from about 25% to about 850% and further comprises a retaining means for retaining the polymeric gel and envelope on the electrical connection.

33 Claims, 6 Drawing Figures

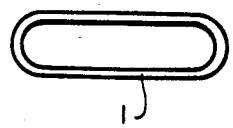
FIG_1A
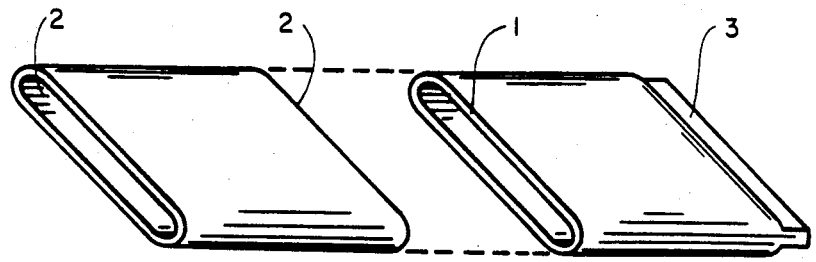
FIG_1B
FIG_2A
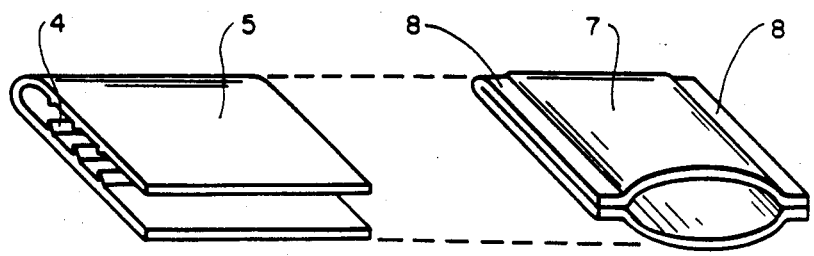
FIG_2B

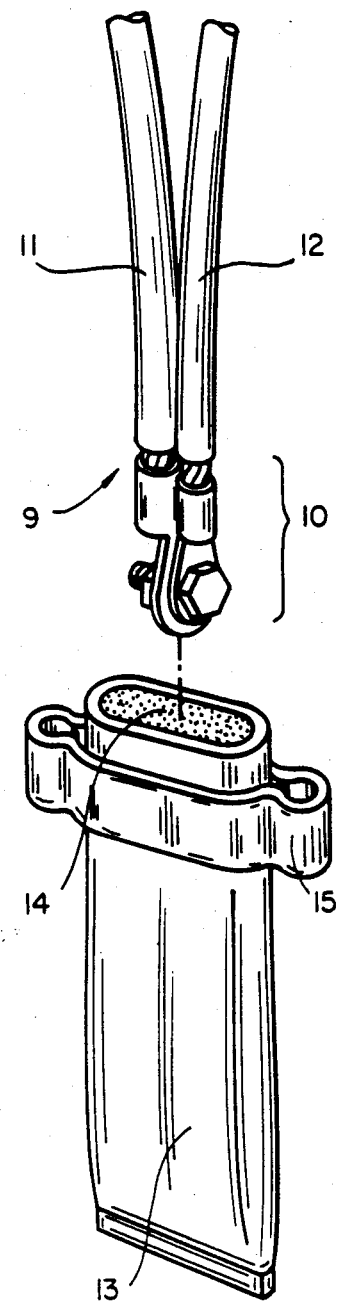
FIG_3

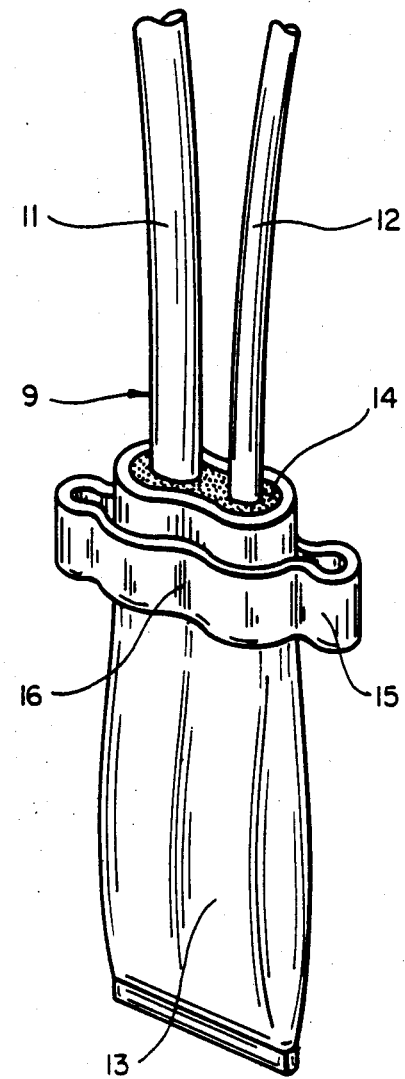
FIG_4

4,721,832

ELECTRICAL CONNECTION SEALING DEVICE

This application is a continuation-in-part of U.S. Ser. No. 730,407, filed May 2, 1985, abandoned, the disclosure of which is incorporated herein by reference.

BACKGROUND OF THE INVENTION (a) The Invention

The invention relates to an article for sealing the exposed portion of an electrical connection of two or more cables. The invention also relates to a method of sealing the exposed portion of an electrical connection of two or more cables.

(b) Background and Information

When constructing electrical devices, for example an electric motor it is often necessary to connect two or more cables or wires at a given point to form an "electrical connection." These cables or wires are often of differing gauges. Generally, the insulation has been removed from the end of the cable. The area where the insulation has been removed i.e. the exposed portion must be reinsulated. In the case of a shielded or armored cable, the shielding and armor is also removed and must be reestablished. Further, it is necessary to seal the exposed portion of the cables and the connection from the environment and its effects. This is generally accomplished by installing an enclosure around the region of the connector.

Enclosures suitable for this use can be, polymeric tubes or sleeves and the like. A polymeric sleeve or tube is placed over the electrical connection and secured to the electrical connection for example a retaining device, or by using a polymeric enclosure that is heat shrinkable preferably with a hot melt adhesive or a mastic. Resin or mastic filled enclosures have also been used to seal the electrical connection. Another method is to wrap the electrical connection with some form of tape.

All of these methods suffer from some problems however. While fastened enclosures and the like may insulate they may not seal against environmental effects such as the ingress of moisture. The sealant may not flow enough to fill voids and seal or may flow out with load cycling when the electrical connection is in use, or may dry and crack after a period of time or upon movement of the cables. The application of heat for heat shrinking requires care that the electrical connection and surrounding areas are not damaged from the heat effect. Installations using tape or other wraps require care in application and tend to leak if not properly overlapped.

In U.S. application Ser. No. 646,555 filed Oct. 31, 1984, now abandoned and U.S. application Ser. No. 772,073, filed Sept. 3, 1985 which is a continuation thereof and U.S. application Ser. No. 859,162, filed May 2, 1986 which is a continuation-in-part of Ser. No. 772,073, commonly assigned, and incorporated herein by reference, a polymeric, a crosslinked polymeric gel comprising a crosslinked, non-silicone liquid rubber is described.

SUMMARY OF THE INVENTION

Novel articles and methods for sealing electrical connections have been discovered which overcome the limitations of the prior art.

In its article aspect the invention relates to an article for sealing the exposed portion of an electrical connection comprising (a) an envelope, having an opening at one end, of a material having a flexural modulus of at least 1,000 psi at 23° C.;
(b) the envelope containing a polymeric gel having a cone penetration value of about 30 to about 400 ($10^{-1}$ mm) and an elongation of from about 25% to about 850%; and
(c) a retaining means to retain the polymeric gel and envelope on the exposed portion of the electrical connection.

Another article aspect relates to an article comprising
(a) an exposed portion of an electrical connection of two or more cables;
(b) an envelope, having an opening at one end, of a material having a flexural modulus of at least 1,000 psi at 23° C.;
(c) the envelope containing a polymeric gel having a cone penetration value of about 30 to about 350 ($10^{-1}$ mm) and an elongation of from about 25% to about 850%;
(d) the envelope and polymeric gel positioned such that it encloses the exposed portion of the electrical connection; and
(e) a retaining means to retain the polymeric gel and envelope on exposed portion of the electrical connection.

Another aspect of the invention relates to a kit for sealing the exposed area of an electrical connection, which comprises
(a) an envelope, having an opening at one end, of a material having a flexural modulus of at least 1,000 psi at 23% C.°;
(b) a polymeric gel having a cone penetration value of about 30 to about 400 ($10^{-1}$ mm) and an elongation of from about 25% to about 850%; and
(c) a retaining means to retain the polymeric gel and envelope on the exposed area of the electrical connection.

In its method aspect the invention relates to a method for sealing the exposed portion of an electrical connection of two or more cables which comprises
(a) providing an envelope, having an opening at one end, of a material having a flexural modulus of at least 1,000 psi at 23% C.°, containing a polymeric gel having a cone penetration value of about 30 to about 400 ($10^{-1}$ mm) and an elongation of from about 25% to about 850%;
(b) positioning the envelope and polymeric gel over the exposed portion of the electrical connection such that the cable connection is sealed; and
(c) engaging a retaining means to retain the envelope and polymeric gel on the exposed portion of electrical connection.

The method also comprises the optional step of deforming the envelope to insert the electrical connection.

Gels are widely known in the art, for example, silicone-based gels, polyurethane-based gels or polystyrenebutadiene-styrene, polystyrene-isoprene-styrene, and polystyrene-ethylene butylene-styrene block copolymer based gels. Preferred for use in this invention are polymeric gels comprising a cross linked, non-silicone liquid rubber.

The polymeric gel is selected such that it has a cone penetration value as measured by ASTM D-937-77, of from about 30 to about 400 ($10^{-1}$ mm) and preferably from about 150 to about 400 ($10^{-1}$ mm). Further, said gel is selected such that it has an elongation, as measured by ASTM D-412, of from about 25% to about 850% and more preferably from about 150% to 750%. The gels may further be selected for their insulation, stress grading, or conductive properties as well as sealing. Generally, it is preferable that the gel should have a dielectric constant (permittivity) of less than 6 at 50 Hz for insulating gels and greater than 6 for stress grading gels (as measured by ASTM D-150). Where the gel is used as insulation as well as sealing, the gels preferably have a volume resistivity of at least 10 ohm-cm (as measured by ASTM D-257). For stress grading applications, the gels preferably have a specific impedance of $10^7$–$10^{10}$ ohm-cm at 50 Hz (ASTM D-150), and for conductive applications, the gels preferably have a volume resistivity of less than $10^7$ ohm-cm. The gels possess sufficient tack to seal and adhere to some degree to the electrical connection or the envelope. Further, the properties of the gel allow cable movement without breaking the seal formed, due to the gels ability to deform and return substantially to its original shape while maintaining the tack necessary to seal. It is contemplated that the gel could be formed in the envelope, i.e. in situ.

Preferred gels for use in this invention are gelloid compositions comprising a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said crosslinked polymer (a) if derived from a solid, relatively high molecular weight polymer, having a gel fraction of at least about 50%, or (b) if derived from a liquid, relatively low molecular weight polymer, having at least about 0.1 (preferably from about 0.1 to about 3) crosslinks per weight average molecule;

said composition having a storage modulus of $(1+2.5v+14.1v^2)x$ dynes/cm$^2$ wherein x is less than $5 \times 10^5$ at 30° C. and greater than $5 \times 10^2$ at 90° C., and v is the volume fraction of the filler, with the proviso that, if the crosslinked polymer is prepared from a solid high molecular weight polymer, the storage modulus at 140° C. is at least about 70% of the storage modulus at 70° C., and a dynamic viscosity of $(1+2.5v+14.1v^2)y$ poises wherein y is less than $1 \times 10^5$ at 30° C. and greater than $5 \times 10^2$ at 90° C. and v is the volume fraction of the filler, said composition exhibiting first degree blocking.

These compositions are preferably prepared by subjecting a non-silicone liquid polymer containing from about 20% to about 95% by weight of a liquid to a crosslinking means such as a chemical means or irradiation means. The polymer starting material is a crosslinkable liquid polymeric material, preferably a non-silicone liquid rubber, with low or no unsaturation prior to crosslinking. The liquid polymeric material preferably has a molecular weight of less than about 90,000, preferably less than about 50,000, and a Mooney viscosity of ML 1+4 at 100° C. of less than 10. Mooney viscosity is measured by ASTM D-1646. Said polymers are primarily liquids at these molecular weights and viscosities. The liquid polymer preferably has a molecular weight less than about 7.5 times the polymer's critical molecular weight (see e.g. Mechanical prop of Polymers, Nielsen 1962 for a discussion of critical molecular weight). The polymers can be a hydrocarbon backbone polymer or a polymer containing carbon as well as other atoms, e.g. oxygen, nitrogen, etc. in the backbone with the exception of silicone. The polymers are limited to those which have low or no unsaturation prior to crosslinking. In general, the amount of unsaturation will be less than about 10% mole, preferably less than about 7 mole percent and preferably less than 4 mole percent. If the unsaturation is too high the resulting product tends to be thermally unstable.

Preferred liquid polymeric materials include liquid butyl rubber, epichlorohydrin rubber, ethylene-propylenediene monomer rubber (EPDM), hydrogenated polyisoprene, hydrogenated polybutadiene, hydrogenated styrene-butadiene rubber (SBR), hydrogenated polychloroprene, functionalized polyisobutylene (i.e. polyisobutylene with reactive groups added that are capable of crosslinking such as hydroxy, amine or carboxy groups), chlorinated polyethylene, liquid fluorinated polymers (e.g. Viton from DuPont), hydrogenated nitrile rubber and other hydrogenated liquid polymers. Further, one can combine the various polymers to form compositions of desired properties.

The liquid dispersed in the crosslinked polymer in accordance with this invention can be any liquid which is capable of being dispersed in the polymer in an amount from about 20% to about 95%, and which does not react during crosslinking of the polymer. The liquid may be a plasticizer, compatibilizer, tackifier, or the like. Suitable liquids include, for example, paraffinic oils, naphthenate oils, aromatic oils, liquid polybutenes, alkyl (or aryl) phthalates, vegetable oils, mineral oils, trimellitates, esters of polyethylene glycols, alkyl (or aryl) phosphates, methyl ester of hydrogenated wood rosin, liquid rosin oils, pine tar, polyterpenes, non-reacting liquid rubbers, the starting liquid polymer which remains uncrosslinked or at least crosslinked less than 0.1 crosslink per weight average molecule, and the like.

Crosslinking may be by any conventional crosslinking means, preferably UV means, irradiation means or by chemical means. Radiation crosslinking can be accomplished by electron beam, or the like treatment. Suitable crosslinking promoters can be incorporated to encourage radiation crosslinking such as triallylcyanurate and triallylisocyanurate. Suitable chemical crosslinking agents can be chosen based on the individual polymer or polymers used. For example, a phenolic resin or p-quinone dioxime can be used to cure butyl rubber, peroxide can be used to cure EPDM or diisocyanate dimer acid can be used to cure epichlorohydrin rubber.

Optionally, plasticizers may be added to help obtain a gelloid with the desired cone penetration values. Such plasticizers preferably would include all liquids which are capable of reducing the viscosity of the base rubber, have low or no unsaturation as described above and are compatible with the base rubber.

A filler may be added to the composition, if desired. Generally, the amount of filler added is from 0 to 0.3 volume fraction. Preferably, the filler is in an amount from 0.1 to 0.2 volume fraction. The term "filler" is used herein to include all solid additives including particulate matter or fibrous matter present in the composition. These fillers include pigments, fillers known for conductive, (both electrical and thermal) stress grading and insulative purposes e.g. carbon black, barium titnate, zinc oxide, iron oxide, silicone carbide, metals and the like, reinforcing agents, thermal stabilizers, fungicides, biocides, flame retardants, for example, aluminum trihydrate, and the halogenated flame retardants, leak indicators (i.e. chemicals which react upon exposure to certain chemicals), corrosion inhibitors, ultraviolet light stabilizers, processing aids, impact modifiers and the like.

The compositions are formed preferably by mixing a liquid non-silicone polymer with any desired fillers in an amount of from 0 to 0.3 volume fraction, any crosslinking agents or the like and the liquid and subjecting the mixture to a crosslinking means. The composition will generally take the shape of the container during crosslinking but can be reshaped e.g. by cutting as desired.

The term cable is used in this application to refer to one or more electrical conductors surrounded by electrical insulation. In the case of an electrical connection such as a motor connection, two or more exposed cable ends, i.e. conductor with insulation removed at its end, are joined to form an electrical connection (e.g. FIG. 3) by soldering, bolt joining or the like. Optionally the cable also has shielding and/or armoring which must also be removed. The sealing method of this invention, is applied to seal the exposed position of the cables of the electrical connection from the environment. The term cable in the general description and claims is to be understood to cover the individual cores of a cable or a main cable or wires or the like.

The envelope is a container or enclosure with an opening at one end large enough to place the gel or material to be formed into a gel therein and to fit the electrical connection therein. The envelope is a material that has a flexural modulus of at least 1,000 psi at 23° C. (as measured by ASTM D790) and is capable of being maintained at 90° C. without melting or decomposing. Preferred are polymers within these parameters. Polymeric materials include polyethylene, polypropylene, polybutane, ethylene copolymers such as ethylene-vinyl acetate and ethylene-ethyl acrylate, polyvinyl chloride, polyvinylidene fluoride, polytetrafluoroethylene (eg Teflon TFE), copolymers of tetrafluoroethylene and hexafluoropropylene (Teflon FEP), copolymers of tetrafluoroethylene and perfluoroalkoxy moieties (Teflon PFA) copolymers of ethylene and tetrafluoroethylene (Tefzel), copolymers of ethylene and chlorotrifluoroethylene (Halar), polyesters (eg Hytrel), polyurethanes, polystyrenes, polystyrene block copolymers, polycarbonate, polyamides, nylons, acrylics, polymethacrylates, polyethers, polysulfones, phenolics, and polyimides. Also preferred are insulated metals. They can be made by any convenient means for example a tube of material can be sealed at one end (FIG. 1) or a sheet of material can be folded over and the two lateral sides sealed (FIG. 2). Where appropriate the envelope material can be insulating, stress grading or conductive as required within the parameters as described for the polymeric gel.

The retaining means is a device or other means for retaining the envelope and polymeric material on the cable connection. Examples of retaining means include a band of material which can be clamped, crimped, twisted, pulled or otherwise made to retain, the band being a suitable metal, polymer or the like, (eg FIG. 4). The retaining means may also be an integral part of the sealing article. For example in FIG. 2 there is a plurality of teeth that are an integral part of the inside of the envelope. These teeth can be extruded into a tube which is then cut and the lateral edges sealed (FIG. 2). On insertion of the electrical connection into the envelope the teeth engage the electrical connection thus resisting the removal of the electrical connection. Also, the modulus of the envelope itself could be high enough to retain the electrical connection and thus became the retaining means. Another form of retaining means would be where the gel is sufficiently tacky and tough to retain the envelope and gel on the electrical connection. One skilled in the art can fashion other retaining means.

The envelope material or the polymeric gel can contain various additives as described. Additives include, for example, stabilizers, reinforcing or non-reinforcing fillers, pigments, carbon black, plasticizers, surfactants, processing aids, corrosion inhibitors, conductive fillers, fungicides, biocides, leak indicators and the like where appropriate.

A seal for an electrical connection is formed by positioning the envelope with the polymeric gel over the electrical connection such that the gel forms an environmental seal for the exposed portions of the cables and the electrical connection thus preventing ingress of water and the like, preferably covering at least a portion of the nonexposed cables. An optional method includes deforming the envelope e.g. applying pressure to the lateral sides, to enlarge the opening at one end to fit the electrical connection therein. Release of the pressure on the lateral sides will cause the envelope to close down on the electrical connection thus either aiding in the retaining of the gel and envelope on the electrical connection or becoming the retaining means itself. The electrical connection may penetrate the gel by the pressure of insertion where the gel either flows around the electrical connection or separates and reseals or the gel may be preslit or the like to facilitate insertion of the electrical connection into the gel. The insertion of the electrical connection will displace an equal volume of the polymeric gel and therefore care must be taken in placing the polymeric gel in the envelope such that there is room left in the envelope for such displacement. The retaining means is then engaged as previously described to retain the polymeric gel and envelope on the electrical connection which is especially important during load cycling, extreme vibrations and the like.

BRIEF DESCRIPTION OF THE DRAWINGS

In the drawings, FIG. 1 shows a cross section 1 of a tube of material open 2 at both ends: FIG. 1A being a transverse cross-section of the envelope and FIG. 1B showing the partial longitudinal cross-section of the envelope, before and after sealing the end thereof. One end 3 is sealed thus forming an envelope of the invention. FIG. 2 shows another embodiment of the envelope: FIG. 2A being a transverse cross-section of the envelope and FIG. 2B showing the partial longitudinal cross-section of the envelope before and after formation thereof by sealing the sides. In this embodiment the retaining means 4 is an integral part of the envelope 7 the envelope which is formed by cutting off the edge of the tubular material 5 and then sealing lateral edges 8. In FIG. 3 electrical connection 9 comprises thick cable 11 and relatively thinner cable 12 which are joined together to form the exposed portion of the electrical connection 10. The article of the invention consists of envelope 13 polymeric gel 14 in the envelope and a crimp retaining ring 15. In FIG. 4 the electrical connection 9 has been inserted in the polymeric gel 14 such that the exposed portion of the electrical connection 10 from FIG. 3 is completely sealed in the gel. The crimp retaining ring 15 has been crimped 16.

The following examples are illustrative only and are not to be construed as limiting the invention. One skilled in the art can readily select appropriate gels, radiation levels, electrical connections, envelopes, retaining means and the like based on the disclosure without undue experimentation.

DESCRIPTION OF THE PREFERRED EMBODIMENTS

EXAMPLE 1

Chemically crosslinked butyl rubber (dielectric gel)

The following formulation was mixed then was cured for 30 minutes at 100° C. to form a gel.

| | |
|---|---|
| Liquid butyl rubber | 100 g |
| Zinc Stearate-filler | 5 g |
| Zirex (Zinc Resinate)-chemical crosslinking activator and filler | 10 g |
| Paraffinic oil - plasticizer | 90 g |
| p-Quinone Dioxime (62.5% in oil)-crosslinking agent | 3.2 g |
| Lead dioxide (50% in dibutylphthalate)-cure actuator | 15 g |
| Carbon black - colorant & U.V. light stabilizer | 2 g |

The resulting gel had a volume resistivity of $10^{14}$ ohm-cm (ASTM D-150), a permitivity @50 Hz of 3.0 (ASTM D-257) a cone penetration of 112 and elongation of 350%.

EXAMPLE 2

Chemically crosslinked butyl rubber (dielectric gel)

The following formulation was mixed then was cured for 5 hours at 140° C.

| | |
|---|---|
| Liquid butyl rubber (Kalene 800) | 100 |
| Paraffinic oil - plasticizer | 620 |
| Zinc Oxide Dispersion (80%) | 19 |
| Carbon black (Statex N660) | 2 |
| Antioxidant (Irgonox 1076) | 2 |
| Silicone antifoaming agent (SAG 47) | 1 |
| Phenolic Resin (HRJ2564) | 36.9 |

The resulting gel had the following properties:
Gel content (based on liquid butyl rubber)=100%
Storage modulus at 30° C.=$2.3 \times 10^3$ dynes/cm$^2$
Storage modulus at 90° C.=$9.3 \times 10^2$ dynes/cm$^2$
Dynamic viscosity at 30° C.=$5.7 \times 10^3$ poises
Dynamic viscosity at 90° C.=$1.98 \times 10^3$ poises
Exhibits first degree blocking.
Core penetration=350 (mm$^{-1}$).

EXAMPLE 3

Chemically crosslinked epichlorohydrin (stress grading gel-oil resistant)

The following formulation was mixed and then cured for 60 minutes at 100° C. to form a gel.

| | |
|---|---|
| Hydrin 10X1 (liquid epichlorohydrin rubber) | 100 g |
| Dimer acid diisocyanate-crosslinking agent | 46 g |
| dioctyl phthalate-plasticizer | 100 g |
| T-12 - tin catalyst | 10 g |
| Dabco 33LV (Tertiary amines - co-catalyst) | 2 g |
| Antioxidant 2246 - substituted phenol type of antioxidant | 0.8 g |

The resulting gel had a specific impedance at 50 Hz of $1.8 \times 10^9$; a permitivity @50 Hz of 7.4, a cone penetration value of 51.

EXAMPLE 4

Stress Grading Butyl gel

| | |
|---|---|
| Kalene 200 (liquid butyl rubber) | 100 g |
| Kaydol oil (mineral oil) | 95 g |
| p-quinone dioxime prespersion (62.5%) | 4.8 g |
| Lead dioxide prespersion (50%) | 18 g |
| N990 Carbon Black (Thermax MT) | 69.4 g |
| S37 Carbon Black) (Vulcan P) | 14.7 g |

Crosslinked at 100° C. for 30 minutes resulted in a gel with cone penetration value of 81, a specific impedance of $9.5 \times 10^8$, a permitivity of 32.6.

EXAMPLE 5

Conductive Butyl Gel

| | |
|---|---|
| Kalene 200 (liquid Butyl rubber) | 100 g |
| Kaydol oil (mineral oil) plasticizer | 95 g |
| p-quimone dioxime prespersion (62.5%) curing agent | 4.8 g |
| Lead dioxide prespersion (50%) curing activiator | 18 g |
| Ketjen carbon black (conductive carbon black) | 20 g |

The above formulation was crosslinked at 100° C. for 30 minutes and resulted in a gel with cone penetration value of 42, volume resistivity $2.4 \times 10^5$ ohm-cm.

EXAMPLE 6

An envelope was made of polyvinylchloride or crosslinked ethylene vinyl acetate copolymer (FIG. 1) having a flexural modulus of greater than 2,400 psi at 23° C. The gels of Example 1 was placed in the envelope and a metallic crimp ring placed on the outside of the envelope. A motor electrical connection (FIG. 3) was inserted into the gel an the crimp ring fastened by means of compressing the ring with pliers. The sealed connection was placed in a water bath at 23° C. for 30 days. No water ingress was observed.

What is claimed:

1. An article for sealing the exposed portion of an electrical connection comprising:
   (A) an envelope, having an opening at one end, of a material having a flexural modulus of at least 1,000 psi at 23° C.;
   (B) the envelope containing a polymeric gel having a cone penetration value of about 30 to about 400 ($10^{-1}$ mm) and an elongation of from about 25% to about 850%; and
   (C) a retaining means to retain the polymeric gel and envelope on the exposed portion of an electrical connection wherein the polymeric gel comprises a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer
   (a) if derived from a solid, relatively high molecular weight polymer, having a gel fraction of at least about 50%, or
   (b) if derived from a liquid, relatively low molecular weight polymer, having at least about 0.1 crosslinks per weight average molecule;
said composition having a storage modulus of $(1+2.5v+14.1v^2)x$ dynes/cm$^2$ wherein x is less than $5 \times 10^5$ at 30° C. and greater than $5 \times 10^2$ at 90° C., and v is the volume fraction of the filler, with the proviso that if the crosslinked polymer is prepared from a solid high molecular weight polymer, the storage modulus at 140° C. is at least about 70% of the storage modulus at 70° C.; and a dynamic viscosity of $(1+2.5v+14.1v^2)y$ poises wherein y is less than $1 \times 10^5$ at 30° C. and greater than $5 \times 10^2$ at 90° C. and v is the volume fraction of the filler, said composition exhibiting first degree blocking.

2. An article according to claim 1, wherein said polymeric gel is derived from a liquid, low molecular weight polymer.

3. An article according to claim 2 wherein the liquid polymer is liquid butyl rubber.

4. An article according to claim 1 wherein the envelope is a polymer.

5. An article according to claim 4 wherein the polymeric is polyvinylchloride or crosslinked ethylene vinyl acetate copolymer.

6. An article according to claim 1 wherein the retaining means is a crimp ring.

7. An article according to claim 1 wherein the retaining means is a plurality of teeth on the inside of the envelope.

8. An article according to claim 1 wherein the envelope material is capable of being maintained at 90° C. without melting or decomposing.

9. An Article comprising:
(A) an exposed portion of an electrical connection of two or more cables;
(B) an envelope, having an opening at one end, of a material having a flexural modulus of at least 1,000 psi at 23° C.;
(C) the envelope containing a polymeric gel having a cone penetration value of about 30 to about 400 ($10^{-1}$ mm) and an elongation of from about 25% to about 850%;
(D) the envelope and polymeric gel positioned such that it encloses the exposed portion of the electrical connection; and
wherein the polymeric gel comprises a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer
(a) if derived from a solid, relatively high molecular weight polymer, having a gel fraction of at least about 50%, or
(b) if derived from a liquid, relatively low molecular weight polymer, having at least about 0.1 crosslinks per weight average molecule;
said composition having a storage modulus of $(1+2.5v+14.1v^2)x$ dynes/cm$^2$ wherein x is less than $5 \times 10^5$ at 30° C. and greater than $5 \times 10^2$ at 90° C., and v is the volume fraction of the filler, with the proviso that if the crosslinked polymer is prepared from a solid high molecular weight polymer, the storage modulus at 140° C. is at least about 70% of the storage modulus at 70° C.; and a dynamic viscosity of $(1+2.5v+14.1v^2)y$ poises wherein y is less than $1 \times 10^5$ at 30° C. and greater than $5 \times 10^2$ at 90° C. and v is the volume fraction of the filler, said composition exhibiting first degree blocking.

10. An article according to claim 9, wherein said polymeric gel is derived from a liquid, low molecular weight polymer.

11. An article according to claim 10 wherein the liquid polymer is liquid butyl rubber.

12. An article according to claim 9 wherein the envelope is a polymer.

13. An article according to claim 12 wherein the polymer is polyvinylchloride or crosslinked ethylene vinyl acetate copolymer.

14. An article according to claim 9 wherein the retaining means is a crimp ring.

15. An article according to claim 9 wherein the retaining means is a plurality of teeth on the inside of the envelope.

16. An article according to claim 9 wherein the envelope material is capable of being maintained at 90° C. without melting or decomposing.

17. A kit for sealing the exposed area of an electrical connection, which comprises
(A) an envelope, having an opening at one end, of a material having a flexural modulus of at least 1,000 psi at 23° C.;
(B) a polymeric gel positioned within the envelope and having a cone penetration value of about 30 to about 400 ($10^{-1}$ mm) and an elongation of from about 25% to about 850%; and
(C) a retaining means to retain the polymeric gel and envelope on the exposed portion of the electrical connection
wherein the polymeric gel comprises a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer
(a) if derived from a solid, relatively high molecular weight polymer, having a gel fraction of at least about 50%, or
(b) if derived from a liquid, relatively low molecular weight polymer, having at least about 0.1 crosslinks per weight average molecule;
said composition having a storage modulus of $(1+2.5v+14.1v^2)x$ dynes/cm$^2$ wherein x is less than $5 \times 10^5$ at 30° C. and greater than $5 \times 10^2$ at 90° C., and v is the volume fraction of the filler, with the proviso that if the crosslinked polymer is prepared from a solid high molecular weight polymer, the storage modulus at 140° C. is at least about 70% of the storage modulus at 70° C.; and a dynamic viscosity of $(1+2.5v+14.1v^2)y$ poises wherein y is less than $1 \times 10^5$ at 30° C. and greater than $5 \times 10^2$ at 90° C. and v is the volume fraction of the filler, said composition exhibiting first degree blocking.

18. A kit according to claim 17, wherein said polymeric gel is derived from a liquid, low molecular weight polymer.

19. A kit according to claim 18 wherein the liquid polymer is liquid butyl rubber.

20. A kit according to claim 17 wherein the envelope is a polymer.

21. A kit according to claim 20 wherein the polymer is polyvinylchloride or crosslinked ethylene vinyl acetate copolymer.

22. A kit according to claim 17 wherein the retaining means is a crimp ring.

23. A kit according to claim 17 wherein the retaining means is a plurality of teeth on the inside of the envelope.

24. A kit according to claim 17 wherein the envelope material is capable of being maintained at 90° C. without melting or decomposing.

25. A method for sealing the exposed portion of an electrical connection of two or more cables which comprises
   (A) providing an envelope, having an opening at one end, of a material having a flexural modulus of at least 1,000 psi at 23% C.°, containing a polymeric gel having a cone penetration value of about 30 to about 400 ($10^{-1}$ mm) and an elongation of from about 25% to about 850%;
   (B) positioning the envelope and polymeric gel over the exposed portion of the electrical connection such that the cable connection is sealed; and
   (C) engaging a retaining means to retain the envelope and polymeric gel on the exposed portion of electrical connection wherein the polymeric gel comprising a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer
   (a) if derived from a solid, relatively high molecular weight polymer, having a gel fraction of at least about 50%, or
   (b) if derived from a liquid, relatively low molecular weight polymer, having at least about 0.1 crosslinks per weight average molecule;

said composition having a storage modulus of $(1+2.5v+14.1v^2)x$ dynes/cm$^2$ wherein x is less than $5 \times 10^5$ at 30° C. and greater than $5 \times 10^2$ at 90° C., and v is the volume fraction of the filler, with the proviso that if the crosslinked polymer is prepared from a solid high molecular weight polymer, the storage modulus at 140° C. is at least about 70% of the storage modulus at 70° C.; and a dynamic viscosity of $(1+2.5v+14.1v^2)y$ poises wherein y is less than $1 \times 10^5$ at 30° C. and greater than $5 \times 10^2$ at 90° C. and v is the volume fraction of the filler, said composition exhibiting first degree blocking.

26. A method according to claim 25, wherein said polymeric gel is derived from a liquid, low molecular weight polymer.

27. A method according to claim 26 wherein the liquid polymer is liquid butyl rubber.

28. A method according to claim 25 wherein the envelope is a polymer.

29. A method according to claim 28 wherein the polymer is polyvinylchloride or crosslinked ethylene vinyl acetate copolymer.

30. A method according to claim 25 wherein the retaining means is a crimp ring.

31. A method according to claim 25 wherein the retaining means is a plurality of teeth on the inside of the envelope.

32. A method according to claim 25 which comprises the additional step of deforming the envelope to insert the electrical connector.

33. A method according to claim 25 wherein the envelope material is capable of being maintained at 90° C. without melting or decomposing.

* * * * *